(12) United States Patent
Abrams et al.

(10) Patent No.: US 12,380,773 B2
(45) Date of Patent: Aug. 5, 2025

(54) KITCHEN DISPLAY SYSTEMS AND METHODS

(71) Applicant: Fiserv, Inc., Brookfield, WI (US)

(72) Inventors: Jacob Whitaker Abrams, San Mateo, CA (US); Jeffrey Blattman, San Jose, CA (US)

(73) Assignee: FISERV, INC., Milwaukee, WI (US)

( * ) Notice: Subject to any disclaimer, the term of this patent is extended or adjusted under 35 U.S.C. 154(b) by 21 days.

(21) Appl. No.: 18/315,939

(22) Filed: May 11, 2023

(65) Prior Publication Data

US 2024/0378971 A1 Nov. 14, 2024

(51) Int. Cl.
*G06F 16/27* (2019.01)
*G07G 1/14* (2006.01)

(52) U.S. Cl.
CPC ............ *G07G 1/14* (2013.01); *G06F 16/27* (2019.01)

(58) Field of Classification Search
CPC ......... G07G 1/14; G06F 16/27; G06F 16/273; G06F 16/275; G06F 3/147; G06F 16/278; G06Q 20/20; G06Q 20/308; G06Q 30/0633; G06Q 50/12; G06Q 20/202; H04L 67/10; H04L 67/51; H04L 67/55; H04L 67/1095
USPC ........................................................ 707/622
See application file for complete search history.

(56) References Cited

U.S. PATENT DOCUMENTS

| | | | |
|---|---|---|---|
| 10,360,648 B1 * | 7/2019 | Rocklin | G07C 11/00 |
| 10,482,499 B2 * | 11/2019 | Li | G06Q 20/20 |
| 11,087,353 B2 | 8/2021 | Beatty et al. | |
| 11,182,762 B1 * | 11/2021 | Bell | G06Q 20/12 |
| 2002/0060808 A1 | 5/2002 | Henderson et al. | |
| 2004/0186762 A1 | 9/2004 | Beaven et al. | |
| 2007/0094085 A1 | 4/2007 | Redmond et al. | |
| 2009/0319382 A1 | 12/2009 | Shah et al. | |
| 2011/0307318 A1 | 12/2011 | Laporte et al. | |
| 2012/0316950 A1 | 12/2012 | Laporte et al. | |
| 2015/0220566 A1 | 8/2015 | Cumming et al. | |
| 2015/0220963 A1 | 8/2015 | Priebatsch | |
| 2018/0315035 A1 | 11/2018 | Johnson et al. | |
| 2019/0272518 A1 | 9/2019 | Speiser et al. | |
| 2020/0226574 A1 | 7/2020 | Golberg | |

OTHER PUBLICATIONS

International Search Report and Written Opinion issued in connection with PCT/US2024/028795 dated Sep. 30, 2024.

* cited by examiner

*Primary Examiner* — Michael Pham
(74) *Attorney, Agent, or Firm* — FOLEY & LARDNER LLP

(57) ABSTRACT

A system and method include determining, by a point of sale (POS) device, that new data is available at the POS device, in response to determining that new data is available, sending the new data to a cloud server, in response to determining that the new data is successfully transmitted to the cloud server, generating a synchronization request indicating availability of new data at the cloud server, identifying one or more kitchen display systems (KDS) to send the synchronization request to, and sending the synchronization request to each of the identified KDS. Each identified KDS retrieves the new data from the cloud server in response to receiving the synchronization request, and at least one of the KDS performs an action based on the new data in response to retrieving the new data. Each KDS follows a similar procedure when new data for the POS device is available at the KDS.

20 Claims, 7 Drawing Sheets

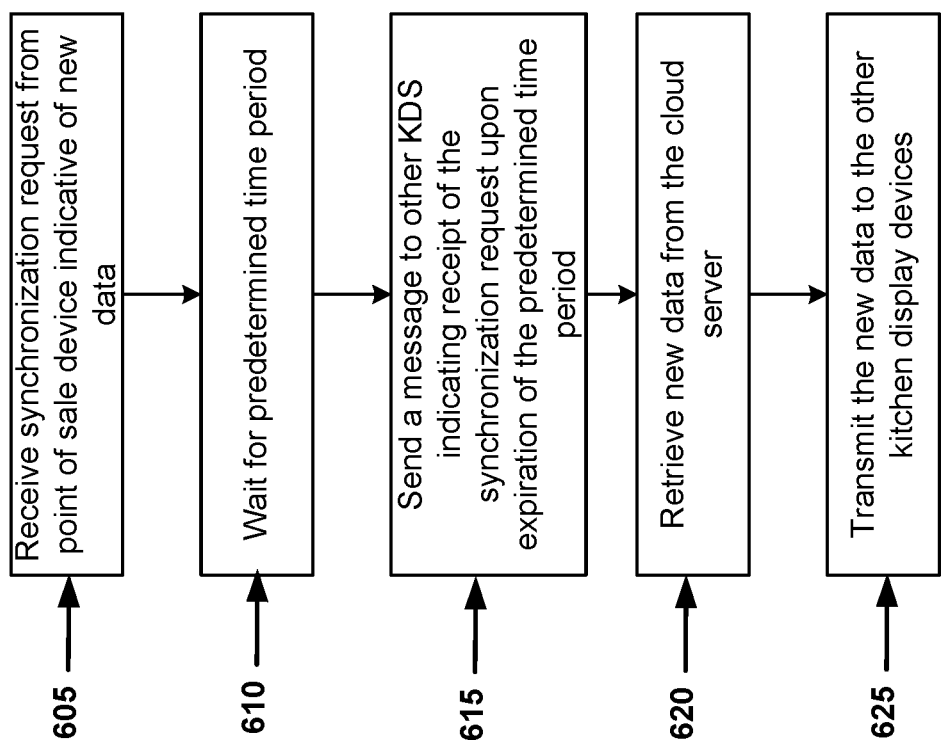

700

| Grill - Active tickets | | 6 Tickets | | Show Completed ▷ |
|---|---|---|---|---|
| 22 · Dine In<br>In-Store · PYNSYNQPRVYM8  ⋯ | 23 · Dine In<br>In-Store · 63RMF93DZQ8H8  ⋯ | In-Store Pickup<br>Online Ordering  Emmanuel M  ⋯ | Main Dining Room 108 · Din…<br>Online Ordering  Emmanuel M  ⋯ | 101 -- Main Dining Room · Di…<br>In-Store · J9G37HTFM9SZ2  ⋯ |
| ⊙ 1 Chips And Curry ◄―715A<br>⊙ 1 Ice Cream ◄―715B<br>  • Sprinkles<br>  • Chocolate Sauce | ⊙ 2 Chips And Curry<br>⊙ 3 Eggo Waffle<br>  • Whipped Cream<br>  • Strawberries<br>  • Maple Syrup | ⊙ 1 Belgian Waffle<br>  • Strawberries<br>  • Blueberries<br>  • Maple Syrup<br>⊙ 1 Chips And Curry<br>⊙ 1 Mucho Waffle | ⊙ 1 Chips And Curry<br>  *Refired*<br>⊙ 1 Waffle Burger<br>  • Grilled Onion<br>  • Ketchup<br>  • Pickles<br>⊙ 1 Waffle Fries | ⊙ 1 Belgian Waffle<br>  • Whipped Cream<br>  • Maple Syrup |
| 705A, 710A | 705B, 710B | 705C, 710C | 705D, 710D | 705E, 710E |
| ⋯ | | Mark Completed 725 | Mark Completed | Mark Completed |
| 20 · Dine In<br>In-Store · WSM1B5VCBJAMA  ⋯ | | | | |
| ⊙ 1 Belgian Waffle<br>  • Whipped Cream<br>  • Plain<br>  • Butter (Whipped)<br>⊙ 1 Mucho Waffle<br>⊙ 1 Waffle Burger<br>  • Lettuce<br>  • Tomato<br>  • Special Sauce<br>  • Onion<br>  • Pickles  705F, 710F | 710G | 710H | 710I | 710J |
| Mark Completed | | | | |

↑ 720

FIG. 7

KITCHEN DISPLAY SYSTEMS AND METHODS

BACKGROUND

Point-of-sale (POS) devices allow users, such as merchants, to facilitate sales transactions to customers. One type of sales transactions may include food ordering. For example, a POS device may receive a food order and transmit the food order to one or more client devices to facilitate food preparation. However, such POS systems and client devices may be limited in their operation, leading to poor user experience and/or inefficient transactions.

SUMMARY

At least one aspect is directed to a system comprising a point of sale device comprising a display, a communication interface to receive information, one or more first servers, and one or more first clients, the one or more first servers and the one or more first clients each associated with one or more memories having computer-readable instructions stored thereon that when executed by at least one of one or more processors cause the at least one of the one or more processors to determine that new data is available at the point of sale device, in response to determining that the new data is available, send the new data to a cloud server, in response to determining that the new data is successfully transmitted to the cloud server, generate a synchronization request indicating availability of the new data at the cloud server, identify one or more kitchen display systems to send the synchronization request to, and send the synchronization request to each of the identified one or more kitchen display systems, wherein each of the kitchen display systems receives the synchronization request, wherein each of the kitchen display systems that receive the synchronization request retrieves the new data from the cloud server in response to receiving the synchronization request, and wherein at least one of the kitchen display systems performs an action based on the new data in response to retrieving the new data.

At least one aspect is directed to one or more non-transitory computer-readable media comprising computer-readable instructions stored thereon that when executed by at least one of one or more processors associated with one or more first servers and one or more first clients of a point of sale device cause the at least one of the one or more processors to determine that new data is available at the point of sale device, wherein the point of sale device further comprises a display and a communication interface to receive information, in response to determining that the new data is available, send the new data to a cloud server, in response to determining that the new data is successfully transmitted to the cloud server, generate a synchronization request indicating availability of the new data at the cloud server, identify one or more kitchen display systems to send the synchronization request to, and send the synchronization request to each of the identified one or more kitchen display systems, wherein each of the kitchen display systems receives the synchronization request, wherein each of the kitchen display systems that receive the synchronization request retrieves the new data from the cloud server in response to receiving the synchronization request, and wherein at least one of the kitchen display systems performs an action based on the new data in response to retrieving the new data.

At least one aspect is directed to a method comprising determining, at a point of sale device, that new data is available at the point of sale device, wherein the point of sale device further comprises a display and a communication interface to receive information, in response to determining that the new data is available, sending, by the point of sale device, the new data to a cloud server, in response to determining that the new data is successfully transmitted to the cloud server, generating, by the point of sale device, a synchronization request indicating availability of the new data at the cloud server, identifying, by the point of sale device, one or more kitchen display systems to send the synchronization request to, and sending, by the point of sale device, the synchronization request to each of the identified one or more kitchen display systems, wherein each of the kitchen display systems receives the synchronization request, wherein each of the kitchen display systems that receive the synchronization request retrieves the new data from the cloud server in response to receiving the synchronization request, and wherein at least one of the kitchen display systems performs an action based on the new data in response to retrieving the new data.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification. The foregoing information and the following detailed description and drawings include illustrative examples and should not be considered as limiting.

BRIEF DESCRIPTION OF THE DRAWINGS

The accompanying drawings are not intended to be drawn to scale. Like reference numbers and designations in the various drawings indicate like elements. For purposes of clarity, not every component can be labeled in every drawing. In the drawings:

FIG. 6 is an example flowchart outlining operations performed by the KDS in synchronizing the new data of FIG. 3 with other KDS, in accordance with some embodiments of the present disclosure.

FIG. 7 is an example user interface of the KDS of FIG. 2, in accordance with some embodiments of the present disclosure.

DETAILED DESCRIPTION

Figure 1:
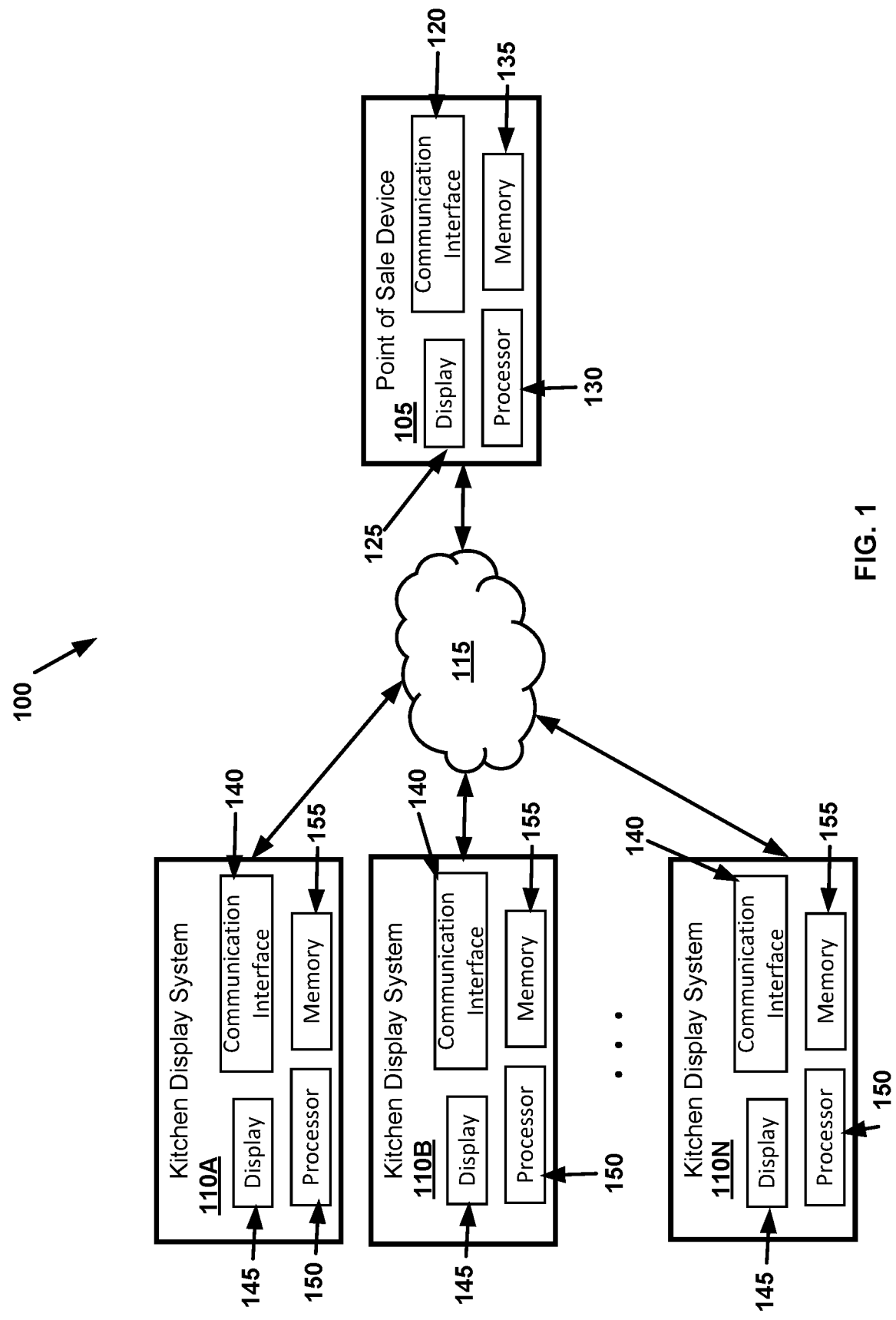
FIG. 1 shows an example block diagram of a transaction system, in accordance with some embodiments of the present disclosure.

Following below are more detailed descriptions of various concepts related to, and implementations of, methods, apparatuses, and systems of improving communications between devices. The various concepts introduced above and discussed in greater detail below can be implemented in any of numerous ways.

The food service industry is facing increasing pressure from consumers to provide high-quality products and services with exacting accuracy, and in shorter amounts of time. Food orders have increasingly become more complex and sophisticated as consumers desire highly customized food items prepared at significantly faster rates. Delays between receiving an order and when that order is sent to the kitchen for preparation may be highly undesirable and may greatly impact the total service time. The present disclosure provides technical solutions that provide a highly efficient transaction system that minimizes the time spent between receiving an order and communicating that order to personnel preparing the order. The transaction system of the present disclosure may allow interactions with local services and/or third-party applications during POS transactions (e.g., financial transactions, advertisement transactions, coupon transactions, etc.) at physical and/or remote retail locations. The transaction system of the present disclosure may also allow for modifications to a transaction to be synchronized across multiple client devices (e.g., the KDS), and may be provided to a server for remote processing A change to a transaction may be, for example, adding new items to the order, adding additional charges (e.g., for shipping), including a donation to a charity with the order, adding taxes, receiving payment information, printing a receipt, applying coupons, adding a special notice on the transaction, or any other changes associated with the transaction.

Synchronization may involve both a push of data from a first client device (e.g., a POS device or a KDS device, etc.) to a data store (e.g., a cloud server) and a distribution or push of that data from the data store to one or more second client devices (e.g., one or more other POS devices, one or more other KDS, etc.). The data store may include one or more databases associated with the transaction system. For example, the data store may include an orders database, a transactions database, an inventory database, etc. In some embodiments, a client device (e.g., POS device, KDS) may implement a queue for recording changes that occur during a transaction. For example, adding an item to an order may cause the queue to record that action for a relatively short period of time. An item may be a product or service associated with the client device. As another example, the client device may record payment information added to the transaction for payment processing. The client device may transmit the items in the queue to the data store (e.g., cloud services server, also referred to herein as a cloud server) over a network. In some embodiments, the cloud server may make the information available at a remote server for further processing. The cloud server may also make the information available for download by other client devices.

In some embodiments, the items may be stored in the queue for a relatively short period of time at the POS device. The POS device may transmit the items in the queue to a server (e.g. cloud services server(s)) over the one or more networks. If the POS device is not able to communicate with the cloud server, the order items may be stored by the POS device in the queue until a connection to the cloud server is established. Once the POS device is able to communicate with the cloud server, items in the queue may be transmitted to the cloud server for storing and further processing. Processing by the cloud server may include adding the items to remote databases, processing payments, and communicating items back to one or more POS devices for further processing, etc. For example, if there are multiple POS devices being utilized by a merchant, and each POS device is creating and transmitting orders to the cloud server, the cloud server may aggregate the orders.

The cloud server may send a notification, via a push server, to be delivered to the KDS. The KDS, upon receiving the notification, may download the items from the cloud server. In some embodiments, waiting for the notification from the push server, accessing the cloud server in response to receiving the notification, and downloading the items may introduce some undesirable latency. Thus, there may be delay between the time the items are received at the POS and the time at which those items are available at the KDS. Reduction of this delay, even if by milliseconds, is desirable. To reduce this delay, the present disclosure provides a mechanism of direct communication between the POS device and the KDS. For example, the POS device may generate and send a synchronization request directly to the KDS to let the KDS know that new data is available at the POS device. Thus, the KDS device is not required to wait for the notification from the push server. Rather, as soon as the KDS receives the synchronization request, the KDS may access the cloud server and retrieve the new data. This may significantly reduce the delay between the time of receiving the new data at the POS device and the time by which that data is available at the KDS.

Thus, the present disclosure provides a highly efficient transaction system By using the synchronization request, communications between the POS device and the KDS may be made faster, thereby reducing network latency. Further, allowing the KDS to be notified about the new data either through the synchronization request or the notification through the push server, the present disclosure provides redundancy and avoids a single point of failure in the transaction system. Thus, the present disclosure improves network communication (e.g., by reducing network latency and increasing the speed of distributing new information), provides increased robustness, and overall increases the efficiency of the POS device, the KDS, and the transaction system. Similar considerations apply when data is originated at the KDS for transmission at the POS device. Although the present disclosure is discussed mainly in terms of food orders, the present disclosure may be applicable in other non-food applications.

Referring now to FIG. 1, an example block diagram of a transaction system 100 is shown, in accordance with some embodiments of the present disclosure. The transaction system 100 includes a POS device 105 in communication with one or more Kitchen Display Systems (KDS) 110A-110N (collectively referred to herein as the KDS 110) via a network 115. Although a single POS device 105 is shown in FIG. 1, in some embodiments, the transaction system 100 may include multiple POS devices, each POS device communicating with one or more of the KDS 110. Similarly, although at least three of the KDS 110 are shown in FIG. 1, in other embodiments, greater than or fewer than three KDS may be used in the transaction system 100.

The transaction system 100 may be used to receive and complete transactions such as sale transactions associated with ordering food. For example, the POS device 105 may be configured to receive an order from a customer. The order may be associated with order data. For example, a customer may place an order for a burger, fries, and a soda. On receiving the order from the customer, the POS device 105 may transmit the order to one or more of the KDS 110 for preparing the order. In some embodiments, each of the KDS 110 may be associated with one or more food preparation stations, and the POS device 105 may transmit the order to the KDS associated with a particular food station based on the order data. For example, in some embodiments, the POS device 105 may transmit the order data associated with the burger to a first KDS, order data associated with the fries to a second KDS, and the order data associated with the soda to a third KDS. In other embodiments, the POS device 105 may transmit all of the order data to each KDS or to a particular one of the KDS designated as an "expediter," which may then transmit the data to other KDS as appropriate. In other embodiments, the POS device 105 may transmit the order data to the KDS 110 in other ways.

The POS device 105 may include a communication interface 120 for receiving input data (e.g., orders), a display 125 for displaying information (e.g., order data associated with the received orders), a processor 130, and a memory 135. The POS device 105 may include other or additional components that may be needed or considered desirable to have in operating the POS device and for performing the functions described herein. Further, the POS device 105 may also be configured to communicate with other servers, and devices, including other POS devices, besides the KDS 110.

Each KDS 110 may include a communication interface 140 for receiving input data (e.g., order data), a display 145 for displaying information (e.g., order data associated with the received orders), a processor 150, and a memory 155. The KDS 110 may include other or additional components that may be needed or considered desirable to have in operating the KDS device and for performing the functions described herein. Further, the KDS 110 may also be configured to communicate with each other, as well as with other servers and devices, including other KDS, besides the POS device 105.

The POS device 105 and the KDS 110 may each be implemented in a variety of computing devices such as computers (e.g., desktop, laptop, servers, data centers, etc.), tablets, personal digital assistants, mobile devices, self-service kiosk, wearable devices, other handheld or portable devices, or any other computing unit suitable for receiving orders and communicating the orders to the KDS 110. The communication interface 120 and the communication interface 140 may be associated with one or more input devices (not shown in FIG. 1) such as a keyboard, stylus, touch screen, mouse, track ball, keypad, microphone, voice recognition, motion recognition, remote controllers, input ports, one or more buttons, dials, joysticks, and any other input peripheral that allows an external source, such as a user to enter information (e.g., order) into the associated device (e.g., the POS device 105 or the KDS 110) or receive data or signals from other devices (e.g., other servers, the POS device, the KDS, etc.).

Similarly, the POS device 105 and the KDS 100 may each be associated with one or more output devices. Although the display 125 and the display 145 is shown in FIG. 1, in other embodiments, the POS device 105 and the KDS 110 may each be associated with other or additional output devices such as external memories, printers, speakers, displays, microphones, light emitting diodes, headphones, video devices, camera devices, and any other output peripherals that are configured to receive information (e.g., order data) from the associated device (e.g., the POS device, the KDS) and/or receive data from other devices (e.g., other servers, the KDS, the POS device). The "data" that is either input into the POS device 105 and the KDS 110 and/or output from the POS device and the KDS may include any of a variety of textual data, signal data, graphical data, combinations thereof, or other types of analog and/or digital data that is suitable for processing using the POS device 105 and the KDS 110.

The processor 130 and the processor 150 may each include or be associated with one or more processing units, such as an electronic processor, an integrated circuit, or the like including one or more of digital logic, analog logic, digital sensors, analog sensors, communication buses, volatile memory, nonvolatile memory, and the like. The processor 130 and the processor 150 may include, but is not limited to, at least one microcontroller unit (MCU), microprocessor unit (MPU), central processing unit (CPU), graphics processing unit (GPU), physics processing unit (PPU), embedded controller (EC), Application Specific Integrated Circuit ("ASIC"), Field Programmable Gate Array ("FPGA"), or any other type of processing unit. The processor 130 and the processor 150 is each configured to execute one or more instructions associated with the POS device 105 and the KDs 110, respectively. The processor 130 and the processor 150 may each include, or be associated with, a memory operable to store or storing one or more instructions for operating the POS device 105 and the KDS 110, respectively. The processor 130 and the processor 150 generally may include one or more communication bus controller to effect communication between the POS device 105 and the KDS 110, respectively, and the other elements of the transaction system 100.

The memory 135 and the memory 155 may each include a memory controller that is configured to read data from or write data to a memory array. In some embodiments, the memory array may include types of volatile and/or nonvolatile memories. For example, in some embodiments, the memory array may include NAND flash memory cores, NOR flash memory cores, Static Random Access Memory (SRAM) cores, Dynamic Random Access Memory (DRAM) cores, Magnetoresistive Random Access Memory (MRAM) cores, Phase Change Memory (PCM) cores, Resistive Random Access Memory (ReRAM) cores, 3D XPoint memory cores, ferroelectric random-access memory (FeRAM) cores, and other types of memory cores that are suitable for use within the memory array. Generally speaking, the memory array may include any of a variety of Random Access Memory (RAM), Read-Only Memory (ROM), Programmable ROM (PROM), Erasable PROM (EPROM), Electrically EPROM (EEPROM), hard disk drives, flash drives, memory tapes, cloud memory, or any combination of primary and/or secondary memory that is suitable for performing the operations described herein.

The memories within the memory array may be individually and independently controlled by the memory controller. In other words, the memory controller may be configured to communicate with each memory within the memory array individually and independently. By communicating with the memory array, the memory controller may be configured to read data from or write data to the memory array in response to instructions received from the associated one of the POS device 105 or the KDS 110. The memory controller may be implemented as a logic circuit in either software, hardware, firmware, or combination thereof to perform the functions described herein.

Communication between the various components of the transaction system 100 may occur via the network 115. The network 115 may include a variety of mediums of communication, such as Ethernet or other wire-based network or a wireless NIC (WNIC) or wireless adapter for communicating with a wireless network, such as a WI-FI network. In some embodiments, the network 115 may be configured as a Local Area Network (LAN) such that the POS device 1405 and the KDS 110 are all on the same LAN. In other embodiments, the network 115 may additionally or alternatively include any suitable network such as an ad hoc network, a personal area network (PAN), a wide area network (WAN), a metropolitan area network (MAN), a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network), or any of a variety of wired and wireless networks including the World Wide Web and the Internet.

In some embodiments, the network 115 may use standard communications technologies and/or protocols. For example, in some embodiments, the network 115 may include links using technologies such as Ethernet, 802.11, worldwide interoperability for microwave access (WiMAX), 3G, 4G, CDMA, digital subscriber line (DSL), multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), etc. The data exchanged over the network 115 may be represented using technologies and/or formats including the hypertext markup language (HTML) and the extensible markup language (XML). In addition, all or some links may be encrypted using conventional encryption technologies such as secure sockets layer (SSL), transport layer security (TLS), and Internet Protocol security (IPsec).

It is to be understood that only some components of the transaction system 100 are shown and described in FIG. 1. However, the transaction system 100 may include other components such as various batteries and power sources, networking interfaces, routers, switches, external memory systems, controllers, servers, printers, etc. Generally speaking, the transaction system 100 may include any of a variety of hardware, software, and/or firmware components that are needed or considered desirable in performing the functions described herein. Similarly, the POS device 105 and the KDS 110 may each include other hardware, software, and/or firmware components that are considered necessary or desirable in performing the functions described herein.

Figure 2:
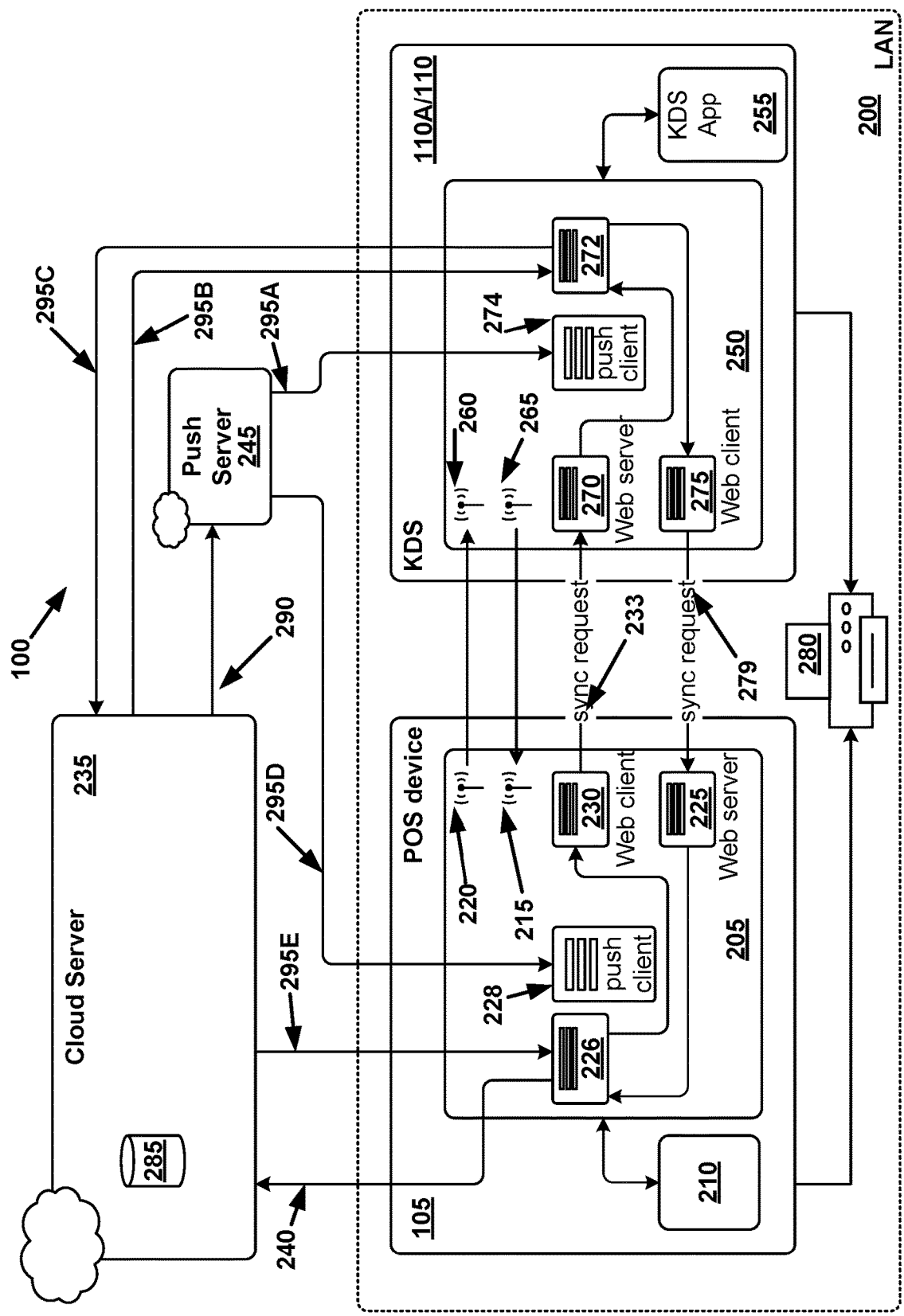
FIG. 2 shows further details of the transaction system of FIG. 1, including an example Point-of-Sale (POS) device in communication with one or more Kitchen Display System (KDS), in accordance with some embodiments of the present disclosure.

Turning to FIG. 2, an example block diagram showing additional details of the transaction system 100 is shown, in accordance with some embodiments of the present disclosure. The transaction system 100 includes the POS device 105 in communication with the KDS 110A. Although not shown, the POS device 105 may communicate similarly with the other KDS 110B-110N. For simplicity, the KDS 110A in the description below is referred to generally as the KDS 110. The POS device 105 and the KDS 110 may communicate via the network 115 (not specifically shown in FIG. 2). In some embodiments, the POS device 105 and the KDS 110 may be on the same network, such as LAN 200. The POS device 105 may be configured to communicate, as described herein, with all KDS devices that are on the same LAN as the POS device. In some embodiments, the POS device 105 may be configured to communicate with KDS on a separate network as the POS device as well. In some embodiments, the LAN on which the POS device 105 and the KDS 110 are may be associated with a merchant. For example, in some embodiments, all POS devices (or at least a subset of POS devices) and all KDS (or at least a subset of KDS) of a particular merchant (e.g., restaurant) may be on the same LAN. The POS devices and all the KDS on the same LAN may communicate as discussed herein.

The POS device 105 may also include an engine 205 and a POS application 210. The engine 205 may include a discovery server 215, a discovery client 220, a web server 225, a synchronization service 226, a push client 228, and a web client 230. The engine 205 may include additional or other elements. The discovery server 215, the discovery client 220, the web server 225, the synchronization service 226, the push client 228, and the web client 230 may be configured to communicate with the KDS 110, as well as with a cloud server 235. The discovery server 215, the discovery client 220, the web server 225, the synchronization service 226, the push client 228, and the web client 230 may be configured to communicate with other elements of the transaction system 100 as well.

The POS application 210 may be a software program designed for performing specific tasks other than the operation of the POS device 105 itself. The POS application 210 may be a built-in application or may be a third-party application. The POS application 210 may be used by end users (e.g., the person operating the POS device 105) to perform one or more tasks. Although a single POS application is shown in FIG. 2, the POS device 105 may include any number of applications thereon. For example, in some embodiments, the POS application 210 may include an order building application to provide an interface for an operator of the merchant/business to facilitate sales transactions (e.g., receive and manage orders). The order building application may have bar code scanner functionality, check-out functionality, payment functionality, or any combination thereof. The order building application may, in some embodiments, be part of a built-in register application for the POS device 105. In other embodiments, the order building application may be provided by third parties. When provided by third parties, the POS application 210 may be installed on the POS device 105 in any suitable way (e.g., downloading executable file from an application store, downloading a web link, etc.). The POS device 105 may similarly include other or additional applications.

The discovery server 215 may be configured to listen for messages from other components of the transaction system 100 intended for the POS device 105. For example, the discovery server 215 may be configured to listen for messages from the KDS 110. In some embodiments, the discovery server 215 may be a User Datagram Protocol (UDP) multicast server that listens for UDP multicast broadcast. In other embodiments, the discovery server 215 may use other types of transport layer protocols or other types of protocols. The discovery server 215 may subscribe to a group identified by the particular merchant (e.g., all devices for a certain merchant may be subbed to the same group). The discovery server 215 may listen for UDP multicast messages (e.g., discovery requests). If a request references a service advertised by the discovery server 215, the discovery server may respond with a host name and port associated with the POS device 105 where the service may be reached. In some embodiments, the discovery server 215 may include, or be associated with, hardware, software, firmware, or combination thereof. Although not shown, the discovery server 215 may include, or be associated with, a processor (which may be the same as or different from the processor 130) and a memory (which may be the same as or different from the memory 135). The discovery server 215 may include, or be associated with, other components of the transaction system 100, and be configured to perform additional operations.

The discovery client 220 may be configured to broadcast a discovery request over the LAN 200 advertising the presence of the POS device 105. For example, the discovery client 220 may transmit a message advertising the presence of a local HTTPS server (e.g., the discovery server 210). The discovery client 220 may broadcast the discovery request to all the KDS connected to the LAN 200. In response to sending the discovery request, the discovery client 220 may be configured to wait for the other KDS (e.g., the KDS 110) to respond such that the POS device and the KDS 110 are mutually aware of each other's presence on the LAN 200. For example, in some embodiments, the discovery client 220 may send the discovery request and the discovery server 215 may listen for responses from the KDS 110. When a response is received from a KDS, the discovery server 215 may inform the discovery client 220. In some embodiments, the discovery server 215 and/or the discovery client 220 may determine a timestamp at which each of the KDS 110 respond. The discovery client 220 (or the discovery server 220, the web server 225, or the web client 230) may maintain a list of all KDS that respond back to the discovery request. For each KDS on the list, the timestamp of the response may be maintained. In some embodiments, the list may maintain additional details of each KDS. In some embodiments, the discovery client 220 may implement a multicast protocol, and particularly a User Datagram Protocol (UDP) for communicating with the KDS 110. In other embodiments, the discovery client 220 may use other types of transport layer protocols or other types of protocols that allow the POS device to communicate with multiple client devices (e.g., the KDS 110). The discovery client 220 may send UDP multicast messages intended to be received by the discovery server 215 running on the same LAN (e.g., the LAN 200). The purpose of discovery is so that each of the POS device 105 and each of the KDS 110 is aware of every other POS device and KDS operated by the same merchant on the same LAN (e.g., the LAN 200) so that the POS devices and the KDSs may exchange messages via the local web client and web server running on each device.

In some embodiments, the discovery client 220 may include, or be associated with, hardware, software, firmware, or combination thereof. Although not shown, the discovery client 220 may include, or be associated with, a processor (which may be the same as or different from the processor 130) and a memory (which may be the same as or different from the memory 135). The discovery client 220 may include, or be associated with, other components of the transaction system 100, and be configured to perform additional operations. The discovery client 220 may also be configured to discover other POS devices on the LAN 200 similarly.

The web server 225 may be configured to receive a message indicating availability of new data at the POS device 105, determine that the new data is to be sent to the cloud server 235 based on the message, and send the new data to the cloud server via the synchronization service 226. In some embodiments, the web server 225 may be configured to perform other or additional operations. In some embodiments, the web server may be a local web server, a peer-to-peer server, etc. In some embodiments, the web server 225 may be another type of server. In some embodiments, the web server 225 may allow an HTTPS connection using a Transport Layer Security (TLS) with a pre-shared key to exchange messages with other POS devices and the KDS 110 on the LAN 200. In some embodiments, the web server 225 may host a single endpoint "/sync" to accept requests (e.g., POST requests) with a message including "hints" indicative of a type of new data that needs to be sent to the cloud server 235. These messages may be called "local synchronization requests." An example local synchronization request may assume the following format in some embodiments: {"authorities": ["com.ABC.orders"], "authority SyncTokenMap": {"com.ABC.orders": 162741685500 0}, "authority ViewMap": { }}.

The local synchronization request above tells a device (e.g., the KDS 110 or the POS device 105) that new data needs to be synchronized with the cloud server 235 unless data newer than the given timestamp (e.g., 1627416855000 in the request above) is available. The "authority" in the local synchronization request above is indication of the type of data to synchronize, in this example "com.ABC.orders," which means that the type of data is order data including order information such as 1 burger, 1 shake, etc. received via the "ABC" POS device (e.g., the POS device 105). In some embodiments, the POS device 105 may synchronize many types of data with the cloud server 235. For example, in some embodiments, the POS device 105 may synchronize data related to employees, orders, inventory, payment details, etc. In other embodiments, the POS device 105 may synchronize other or additional types of data. The local synchronization request may identify the type of data to be synchronized with the cloud server 235. In some embodiments, the local synchronization request may also identify line item events, which describe actions that are relevant to the KDS 110, such as an item being requested or ready. Thus, for example, when the local synchronization request indicates a line item event type of data, the data may be synchronized with the cloud server 235 for retrieval by the KDS 110.

Therefore, when a local synchronization request is received, based on the type of data in the local synchronization request, the web server 225 may perform a synchronization with the cloud server 235 by sending the data referenced in the message to the cloud server 235, as indicated by new data 240. In some embodiments, the web server 225 may use a HTTP and websocket based protocol to receive and send data to the cloud server 235, as well as other sources (e.g., the KDS 110). In other embodiments, the web server 225 may use other mechanisms to communicate with the cloud server 235 and the KDS 110.

In some embodiments, the web server 225 may not actually perform the data synchronization with the cloud server 235. In some embodiments, the web server 225 may not even communicate with the cloud server 235. Rather, in some embodiments, in response to determining that a type of data that needs to be synchronized with the cloud server 235 is available, the web server 225 may utilize the synchronization service 226. Data synchronization is performed by the synchronization services 226. In some embodiments, the synchronization service 226 may communicate with the cloud server 235 and send/receive data changes to keep the data at the POS device 105 in synchronization with the cloud server. In some embodiments, the synchronization service 226 may use a protocol that runs over HTTPS to send/receive data that has changed since the POS device 105 last synchronized with the cloud server 235. When the cloud server 235 receives a data update, the cloud server uses websockets to send a push message to all the devices (e.g., all the POS devices and all the KDS, as well as push server 245) that are associated with a merchant other than the device that generated the data change notifying the devices that a synchronization operation needs to be performed for the relevant data type. The push message from the cloud server 235 may be received by the push client 228.

The push message may be formatted similar to the local synchronization request described above, providing an indication that the devices may perform a synchronization with the cloud server 235 using their respective synchronization service. The devices may then check a synchronization token internally to see if they already have data up to the given timestamp, if so they may ignore the synchronization message, if not they may perform a synchronization using their respective synchronization service to obtain the latest data for the given category (e.g., associated with the authority) from the cloud server 235.

The web server 225 may also be used for bi-directional discovery. For example, when device A discovers device B (e.g., using the UDP discovery mechanism), device A may call into the web server on device B (e.g., the service it just discovered), and device A may tell device B that device A exists. In some embodiments, the web server 225 may include, or be associated with, hardware, software, firmware, or combination thereof. Although not shown, the web server 225 may include, or be associated with, a processor (which may be the same as or different from the processor 130) and a memory (which may be the same as or different from the memory 135). The web server 225 may include, or be associated with, other components of the transaction system 100, and be configured to perform additional operations.

The web client 230 may be configured to utilize the discovery server 215 and the discovery client 220 to identify the KDS 110 that are on the LAN 200 (e.g., the same LAN as the POS device 105 and belonging to the same merchant). In some embodiments, the web client 230 may be a peer-to-peer client. In some embodiments, the web server 225 and the web client 230 may form a peer-to-peer software component that may be configured to communicate using a peer-to-peer communication protocol with a peer-to-peer software component on each of the KDS 110. The peer-to-peer software component on each of the KDS 110 may include a web server (e.g., web server 270) and a web client (e.g., web client 275). In other embodiments, the web client 230 may be another type of client configured to perform the functions described herein. The web client 230 may determine that new data is available that is to be synchronized with the cloud server 235. The web client 230 may also determine that the new data has been synchronized with the cloud server 235. For example, in some embodiments, the web client 230 may receive a message from the web server 225 that the new data 240 has been stored at the cloud server 235. In some embodiments, the web client 230 may receive a message directly from the cloud server 235 that the new data 240 has been stored at the cloud server. In response to determining that the new data 240 has been successfully stored at the cloud server 235, the web client 230 may generate a synchronization request 233, also referred to herein as a local synchronization request. The synchronization request 233 may indicate to the KDS 110 that the new data 240 is available at the cloud server 235. In some embodiments, in response to generating the synchronization request 233, the web client 230 may send the synchronization request to each of the KDS 110. In some embodiments, the web client 230 may send the synchronization request 233 to each discovered instance of the KDS 110 (e.g., discovered by the discovery web server 215 and the discovery client 220). In some embodiments, the web client 230 may maintain a list of all discovered instances of the KDS 110 that are on the LAN 200. In some embodiments, the web client 230 may receive the list from the discovery client 220.

In some embodiments, the list may include a time stamp (e.g., discovered time) indicating when each of the KDS 110 was discovered. The web client 230 may store the list in an associated persistent memory. The web client 230 may keep track of the last discovered time of each of the KDS 110. If the discovered time of a particular KDS reaches a predetermined age (e.g., the discovered time is greater than a threshold), the web client 230 may remove the particular KDS from the list (or at least mark the KDS as inactive). Thus, the web client 230 may continuously monitor and track each KDS on the LAN 200. By keeping track of the discovered time, the web client 230 may send the synchronization request 233 to those KDS that are still active. The web client 230 may also periodically receive an updated list from the discovery client 220 and replace the previous list with the newly received list. In some embodiments, the web client 230 may request the discovery client 220 for an updated list each time the synchronization request is to be generated.

The web client 230 may then send the synchronization request 233 to each KDS whose discovered time is less than or equal to the threshold (in other words, each KDS that is currently still considered active). The synchronization request 233 may accelerate requests to the KDS 110 so that the new data 240 is synchronized from the POS device 105 (e.g., pulled from the cloud server 235) faster. The synchronization request may reduce the timeframe in which the KDS is made aware that the new data 240 is available at the cloud server 235. The sooner the KDS 110 is made aware of the availability of the new data 240, the sooner the KDS may be able to retrieve the new data from the cloud server and take action. The synchronization request 233 may also serve as a backup in case a push server 245 is experiencing a delay. As discussed in more detail below, the push server 245 may be configured to send notifications to the KDS 110 and the POS device 105 when the new data 240 is available at the cloud server 235. By using the synchronization request 233, redundancy may be provided such that the KDS 110 has access to the new data 240 as soon as possible with minimal delay. In some embodiments, the synchronization request 233 may be a LAN synchronization request. In other embodiments, the synchronization request 233 may be another type of request intended to communicate the availability of new data at the POS device 105.

In some embodiments, the synchronization request 233 may include a timestamp indicating when the new data 240 was synchronized with the cloud server 235. In some embodiments, this timestamp may be the time when the new data 240 was sent from the POS device 105 to the cloud server 235. In some embodiments, this timestamp may be the time at which the web client 230 determines that the new data 240 has been successfully stored/saved at the cloud server 235.

Similar to the POS device 105, the KDS 110 may include an engine 250 and a KDS application 255. The engine 250 may include a discovery server 260, a discovery client 265, a web server 270, a synchronization service 272, a push client 274, and a web client 275. The engine 250 may include additional or other elements. The discovery server 260, the discovery client 265, the web server 270, the synchronization service 272, the push client 274, fand the web client 275 may be configured to communicate with the POS device 105, other KDS in the LAN 200, the cloud server 235, the push server 24, and any other elements of the transaction system 100.

The KDS application 255 may be a software program designed for performing specific tasks other than the operation of the KDS itself. The KDS application 255 may be a built-in application or may be a third-party application. The KDS application 255 may be used by kitchen staff or other restaurant personnel to perform one or more tasks. Although a single application (e.g., the KDS application 255) is shown in FIG. 2, the KDS 110 may include any number of applications thereon. The KDS application 255 may allow tracking progression of order preparation and completion, enable communication between personnel, and perform other operations relating to order receipt, order preparation, and order completion. The discovery server 260, the discovery client 265, the web server 270, and the web client 275 may each be configured to perform similar operations as the discovery server 215, the discovery client 220, the web server 225, and the web client 230, respectively, and therefore, not described again. The web client 275 may also be configured to generate a synchronization request 279 similar to the synchronization request 233.

The transaction system 100 may also include a printer 280. Although a single printer 280 is shown, in other embodiments, multiple printers may be provided. The printer 280 may be configured for communication with the POS device 105 and the KDS 110. The printer 280 may be configured to print data received from the POS device 105 or the KDS 110. The printer 280 may be on the LAN 200. In other embodiments, the transaction system 100 may include other or additional elements.

The cloud server 235 may be a remote server in communication with the POS device 105. The cloud server 235 may also communicate with the KDS 110 directly, as well as via the push server 245. For example, in some embodiments, when the new data 240 is received from the POS device 105, the cloud server 235 may store the data within a database 285. Responsive to successfully storing the new data 240 within the database 285, the cloud server 235 may send a message 290 to the push server 245. The message 290 may indicate that the new data 240 is available at the cloud server 235 for the KDS 110 to download. The message 290 may also include a timestamp associated with when the new data 240 was either received from the POS device 105 or when the new data was saved within the database 285. The push server 245 may then transmit a message 295A (e.g., an availability message) to the KDS 110, and particularly to the push client 274 indicating to the KDS that the new data 240 is available at the cloud server 235 to download. The message 295A may indicate the timestamp received in the message 290. In response to receiving the message 295A from the push server 245, the KDS 110 may access the cloud server 235 to download new data 295B (e.g., the new data 240) associated with the timestamp in the message 295A.

In some embodiments, the cloud server 235 may receive new data 295C from the KDS 110. For example, when the new data 295C is available at the KDS 110 that is intended, for example, for the POS device 105, the KDS may transmit that data to the cloud server 235. The cloud server 235 may store the new data 295C within the database 285 and send the message 290 615 to the push server 245. The push server 245 may then send a message 295D to the push client 228 of the POS device 105. The message 295D may be structured similar to the message 295A. In response to receiving the message 295D, the POS device 105 may download new data 295E (e.g., the new data 295C) from the cloud server.

In some embodiments, the KDS 110 may also send the synchronization request 279 to the POS device 105 indicating the availability of the new data at the KDS. In response to receiving the message 295D from the push server 245 or the synchronization request 279 from the KDS 110, the POS device 105 may retrieve the new data from the cloud server 235.

The cloud server 235 and the push server 245 may include one or more independent computer systems, including one or more processors and one or more memories for performing back-end processes for the transaction system 100. In some embodiments, the cloud server 235 and the push server 245 may be coupled for communication with the POS device 105, the KDS 100, and one or more remote services servers via a back-end Application Programming Interface (API). The cloud server 235 and the push server 245 may communicate with the POS device 105, the KDS 100, and one or more remote services servers via the network 115.

Figure 3:
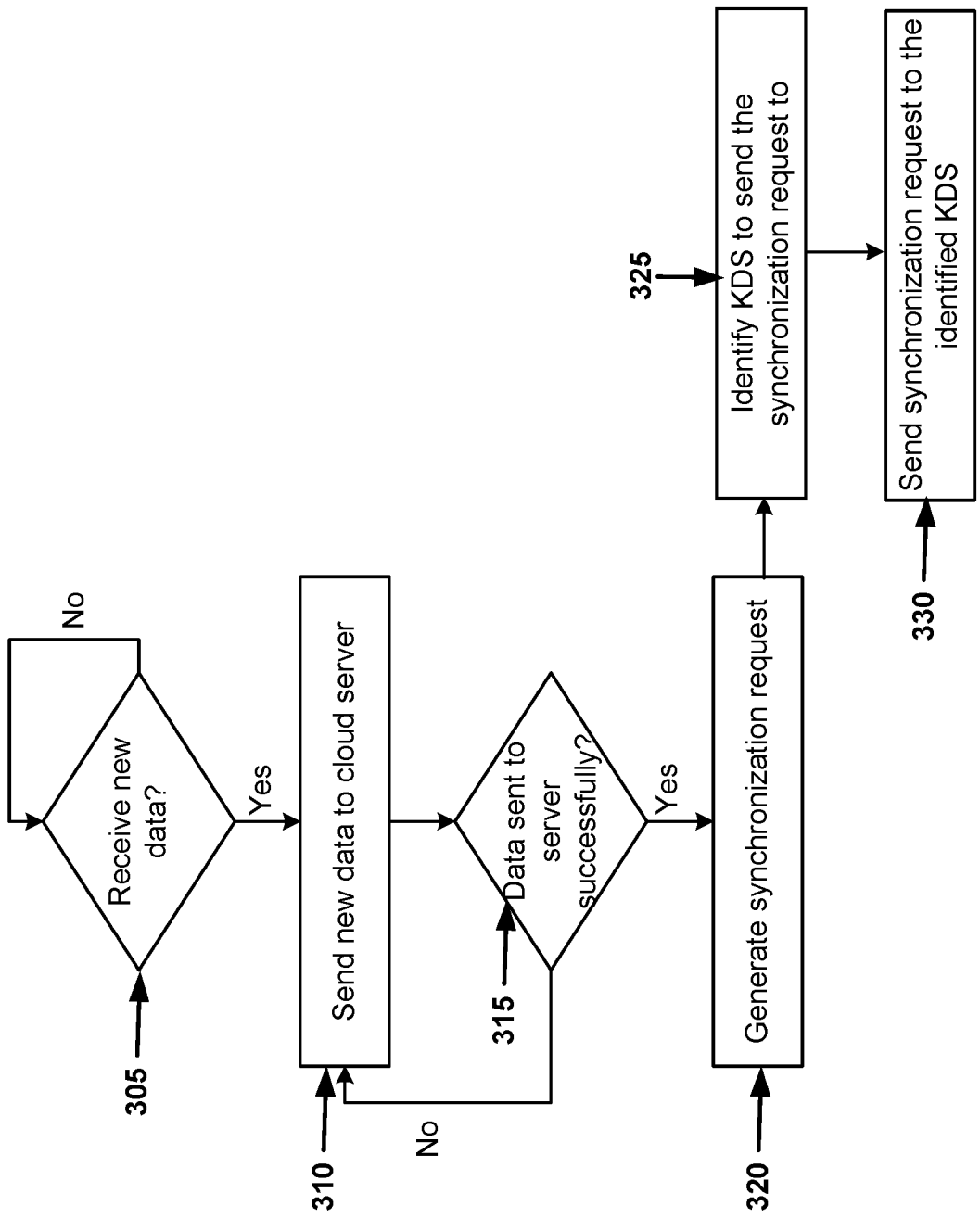
FIG. 3 is an example flowchart outlining operations performed by the POS device of FIG. 2 for communicating presence of new data to the KDS of FIG. 2, in accordance with some embodiments of the present disclosure.

Turning to FIG. 3, an example flowchart outlining operations of process 300 is shown, in accordance with some embodiments of the present disclosure. The process 300 may be implemented by one or more processors (e.g., the processor 130) of the POS device 105. In some embodiments, all operations of the process 300 may be performed by a single processor associated with the POS device 105. In some embodiments, one or more operations of the process 300 may be performed by one processor and remaining operations of the process 300 may be performed by one or more additional processors of a distributed processor system. The process 300 may include other or additional operations depending upon the embodiment. Although the process 300 is described from the perspective of the POS device 105 sending new data to the KDS 110, in some embodiments, the process 300 may also be implemented by the KDS to send new data to the POS device 105 in a similar way.

When new data is available at the POS device 105, the POS device may send the new data to the cloud server 235, which may then send a push message to indicate the presence of the new data to the KDS 110 (and/or the other POS devices on the LAN 200) The KDS 110 (and/or the other POS devices on the LAN 200) may then retrieve the new data from the cloud server 235. Thus, at operation 305, the POS device 105 receives new data. For example, when the POS device 105 receives a new order, the POS device may determine that new data is available. Specifically, at the operation 305, the web server 225 may receive a message (e.g., a local synchronization request) via the communication interface 120 indicating availability of the new data 240. The new data 240 may be order information received from a customer (e.g., a new line item for an order, payment information), new information from another POS device, or any other type of new information intended for the KDS 110. The message may include a type of the new data 240. In some embodiments, based on the type, the web server 225 may determine whether the new data 240 is to be transmitted to the cloud server 235 or not. If the new data is to be communicated to the KDS 110, the web server 225 (e.g., via the synchronization service 226) sends the new data 240 to the cloud server 235 at operation 310. In some embodiments, the POS device 105 may send all new data to the cloud server 235 without determining the type of the data.

At operation 315, the POS device 105 determines whether the new data 240 was successfully synchronized with the cloud server 235. If the new data 240 is successfully synchronized with the cloud server 235, at operation 320, the POS device 105, and particularly the web client 230 generates the synchronization request 233. The synchronization request 233 may be a LAN synchronization request. If, at the operation 315, the new data 240 is not successfully synchronized with the cloud server 235, the process 300 returns to the operation 310 to try to send the new data to the cloud server 235 again. The web server 230 may attempt to send the new data 240 to the cloud server 235 until the new data is successfully synchronized or until a predetermined number of attempts are exhausted.

At operation 325, the web client 230 identifies which of the KDS 110 are to receive the synchronization request 233. In particular, the web client 230 may determine which of the KDS 110 on the LAN 200 are still considered active. For example, the web client 230 may determine which of the KDS 110 have a discovered time that is less than a threshold (e.g., were discovered in the last day, etc). With regard to sending the synchronization request from the cloud server 235 to the client (e.g. the KDS 110), the sending may occur over a persistent websocket connection. The cloud server 235 may know if the device (e.g., the KDS 110) has an open connection, so the cloud server may be able to determine if the synchronization message is able to be sent to the device (e.g., the KDS 110). If no connection exists, the cloud server 235 may bold the synchronization message for a limited time. When/if the device (e.g., the KDS 110) connects, the cloud server 235 may then deliver all pending synchronization messages. At operation 330, the web client 230 sends the synchronization request 233 to each of the KDS 110 identified at the operation 325.

As indicated above, the process 300 may also be performed by the KDS 110 to the send new data 295C to the POS device 105. In such situations, at the operation 305, the KDS 110 determines availability of the new data 295C similar to the POS device. At operation 310, the web server 270 of the KDS 110 sends the new data 295C to the cloud server 235. At the operation 240, the KDS determines if the new data 295C was successfully transmitted to the cloud server 235. Responsive to successful transmission, at the operation 320, the web client 275 of the KDS 110 generates the synchronization request 279. At the operation 325, the web client 275 identifies which of the POS device 105 to send the synchronization request 279 to. Similar to the POS device 105, the web client 275 may maintain a list of all POS devices connected to the LAN 200 along with a timestamp of when the POS device was discovered. The web client 275 may determine which of the POS devices are still considered active (e.g., have a discovered time less than a threshold). At the operation 330, the web client 275 sends the synchronization request 279 to each of the POS device 105 identified at the operation 325.

Figure 4:
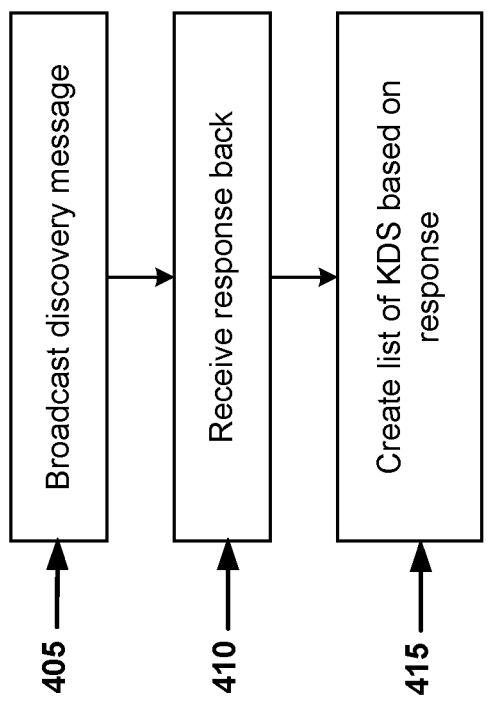
FIG. 4 is an example flowchart outlining operations performed by the POS device for discovering the KDS, in accordance with some embodiments of the present disclosure.

Referring to FIG. 4, an example flowchart outlining operations of process 400 is shown, in accordance with some embodiments of the present disclosure. The process 400 may be implemented by one or more processors (e.g., the processor 130) of the POS device 105. In some embodiments, all operations of the process 400 may be performed by a single processor associated with the POS device 105. In some embodiments, one or more operations of the process 400 may be performed by one processor and remaining operations of the process 400 may be performed by one or more additional processors of a distributed processor system. The process 400 may include other or additional operations depending upon the embodiment. Although the process 400 is described from the perspective of the POS device 105 to discover the KDS 110 on the LAN 200, in some embodiments, the process 400 may also be implemented by the KDS to discover the POS device 105 on the LAN 200 in a similar way.

At operation 405, the POS device 10S, and particularly the discovery client 220 broadcasts a discovery request. The discovery request may include a name of the service being advertised, as well as a protocol version. For example, the name of the service may be "ABC synchronization service." This service essentially makes a request to the other devices that implement a similar synchronization service on the LAN 200 to respond back to the discovery client 220. The discovery request is received by all the KDS 110 on the LAN 200. In some embodiments, the discovery request may be received by devices other than the KDS 110 connected to the LAN 200 as well. At operation 410, the discovery server 215 receives a response back to the discovery request of the operation 405 from each of the KDS 110 (as well as the other devices) on the LAN 200 that are operational and received the discovery request. In some embodiments, the response may include protocol version, the name of the sending device's (e.g., the discovery client 220) synchronization service, and the network address of the synchronization service. For example, at the operation 405, the discovery client 220 may send a discovery request: "service: foo, version: 1". At the operation 410, the discovery client 220 may receive a following example response. "service: foo, version: 1, host: 192, 168.0.43, port. 8080" At operation 415, the discovery server 215 generates a list of all the KDS 110 that responded back at the operation 410. In some embodiments, the discovery server 215 may include a timestamp for each of the KDS 110 being added to the list. The timestamp may be the time at which the discovery server 215 received a response from a particular KDS. The list may identify each KDS (e.g., using a unique name or identifier associated with the KDS) and include any additional information that may be needed to communicate with those KDS The discovery server 215 and/or the discovery client 220 may also transmit the list to the web client 230.

Similar to discovering the KDS 110 by the POS device 105, the process 400 may be used by the KDS to discover each of the POS devices on the LAN 200. Thus, at the operation 405, each of the KDS 110, and particularly, the discovery client 265 transmits a discovery request. At the operation 410, the KDS 110 receives a response back from each POS device 105 that is operational and received the discovery request of the operation 405. At the operation 415, the KDS 110 creates a list of all POS devices that responded back at the operation 410. The list may identify the POS device and include a timestamp at which the POS device was discovered. The list may include other information as well.

Figure 5:
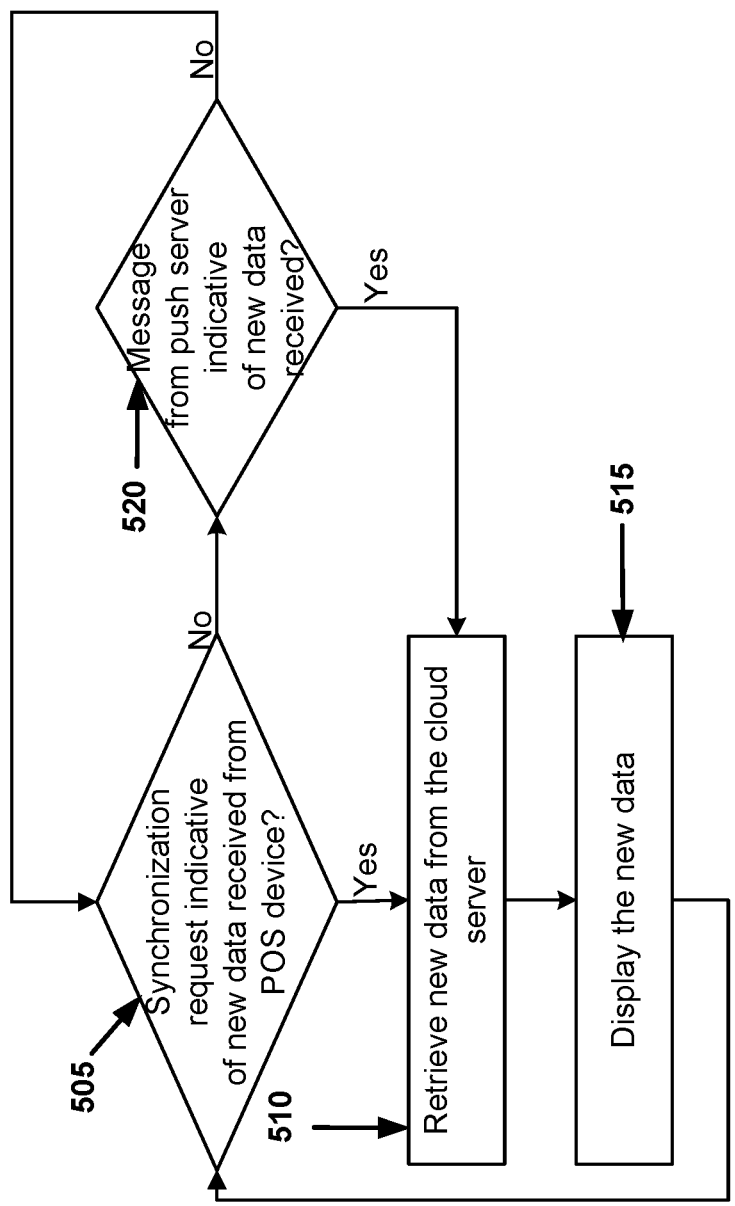
FIG. 5 is an example flowchart outlining operations performed by the KDS in retrieving the new data of FIG. 3, in accordance with some embodiments of the present disclosure.

Referring to FIG. 5, an example flowchart outlining operations of process 500 is shown, in accordance with some embodiments of the present disclosure. The process 500 may be implemented by one or more processors (e.g., the processor 150) of the KDS 110. In some embodiments, all operations of the process 500 may be performed by a single processor associated with the KDS 110. In some embodiments, one or more operations of the process 500 may be performed by one processor and remaining operations of the process 500 may be performed by one or more additional processors of a distributed processor system. The process 500 may include other or additional operations depending upon the embodiment. Although the process 500 is described from the perspective of the KDS 110 to retrieve new data from the cloud server 235, in some embodiments, the process 500 may also be implemented by the POS device 105 to retrieve new data from the cloud server in a similar way.

At operation 505, the web server 270 of the KDS 110 receives the synchronization request 233 transmitted by the web client 230 of the POS device 105. The synchronization request 233 is indicative of the new data 240 available at the POS device 105 that needs to be synchronized to the KDS 110. The synchronization request 233 may include a timestamp associated with the new data 240. In response to receiving the synchronization request, the web server 270 of the KDS 110 accesses the cloud server 235 with the timestamp from the synchronization request and retrieves the new data 295B from the database 285 that is associated with the timestamp. The new data 295B that is retrieved is displayed on the display 145 of the KDS 110. Based on the new data 295B, the KDS 110 may take one or more actions such as start preparing a new order, add/delete/modify an existing order, etc. In some embodiments, in response to new data, the KDS 110 may display new order tickets, change the status of order tickets and individual line items in the ticket. For example, in some embodiments, an order for a sandwich may change form status "requested" to "ready," or the whole ticket may change from "active" to "complete". Additional new line items may be added to the order ticket, or line items may be removed.

The process 500 then loops back to the operation 505 to wait for the next synchronization request 233 from the POS device 105. On the other band, if a synchronization request is not received from the POS device 105 at the operation 505, the web client 275 determines if a message (e.g., the message 295A) is received from the push server 245. The message 295A from the push server 245 may include a timestamp associated with the new data 240. The KDS 110, in response to receiving the message, accesses the cloud server 235 with the timestamp from the message and retrieves the new data 295B from the database 285 that is associated with the timestamp.

Thus, the present disclosure provides a redundancy such that the KDS 110 has at least two mechanisms to be notified of the new data 240 at the POS device 105. The synchronization request from the POS device 105 to the KDS 110 of the operation 505 may be faster than the message from the push server 245, reducing the latency at the KDS in receiving the new data. In fast paced environments such as a restaurant, timeliness of information is essential and even a ten second delay in receiving the new data may be considered undesirable. By providing a mechanism to receive notifications of the new data 240 from the POS device 105 directly as well as by the push server 245, the present disclosure provides protection from outages at the push server or the POS device. The synchronization request from the POS device 105 also avoids the situations where the messages from the push server 245 are lost or delayed due to network errors or delays.

The process 500 may also be used by the POS device 105 to retrieve the new data 295C from the cloud server 235. Thus, the POS device 105 receives the synchronization request 279 from the KDS 110 at the operation 505, access and retrieve the new data from the cloud server at the operation 510 using the timestamp in the synchronization request, and display the new data on the display 125 of the POS device 105. At operation 520, the POS device 105 also receives the message 295D from the push server 245. In response to the message, the POS device 105 may access the cloud server 235 and retrieve the new data, as discussed above using the timestamp in the message 295D.

Referring to FIG. 6, an example flowchart outlining operations of process 600 is shown, in accordance with some embodiments of the present disclosure. The process 600 may be implemented by one or more processors (e.g., the processor 150) of the KDS 110. In some embodiments, all operations of the process 600 may be performed by a single processor associated with the KDS 110. In some embodiments, one or more operations of the process 600 may be performed by one processor and remaining operations of the process 600 may be performed by one or more additional processors of a distributed processor system. The process 600 may include other or additional operations depending upon the embodiment. Although the process 600 is described from the perspective of the KDS 110 to retrieve new data from the cloud server 235, in some embodiments, the process 600 may also be implemented by the POS device 105 to retrieve new data from the cloud server in a similar way.

As indicated above, in some embodiments, the transaction system 100 may include a plurality of the KDS 110. In some embodiments, to avoid each KDS from accessing and retrieving any new data, one KDS may retrieve the new data and then broadcast the new data to the other KDS on the LAN 200. Thus, at operation 605, a first KDS (e.g., the KDS 110) receives the synchronization request 233 from the POS device 105. In some embodiments, the POS device 105 may sent the synchronization request 233 to one of the plurality of the KDS 110. In other embodiments, the POS device 105 may send the synchronization request 233 to all of the KDS 110 on the LAN 200. The first KDS (e.g., the KDS 110) may or may not be, in some embodiments, the first KDS to receive the synchronization request 233.

At operation 610, the first KDS waits for a predetermined time period (e.g., a few milliseconds) to see if another KDS on the LAN 200 that also received the synchronization request 233 is retrieving the new data from the cloud server 235. In the predetermined time period, the web server 270 of the first KDS listens for a response from the other KDS which may be accessing the cloud server 235 for the new data. On receiving no response from any other KDS within the predetermined time period, at operation 615, the first KDS sends a message to the other KDS on the LAN 200 indicating receipt of the synchronization request 233 from the POS device 105 and that the first KDS is retrieving the new data from the cloud server 235. The message indicates to the other KDS that they do not need to access the cloud server 235. At operation 620, the first KDS accesses the cloud server 235, as discussed above, and retrieves the new data. At operation 625, the first KDS broadcasts the new data to the other KDS for display on their respective displays. The new data may also be displayed on the display 145 of the first KDS.

Although the process 600 is described with respect to the synchronization request 233, in some embodiments, the process 600 may also be executed for the message 295A received from the push server 245. In particular, when the first KDS (e.g., the KDS 110) receives the message 295, the first KDS may wait for a predetermined time period at the operation 610 before sending a message to the other KDS at the operation 615. At the operation 620, the first KDS retrieves the new data from the cloud server, and broadcasts that new data to the other KDS at the operation 625.

Likewise, the process 600 may be executed by the POS device 105. As mentioned above, in some embodiments, the transaction system 100 may include a plurality of the POS devices 105 on the LAN 200. In such situations, one of the POS devices may retrieve the new data 295E from the cloud server 235 and broadcast the new data to the other POS devices on the LAN 200. For example, in response to receiving the synchronization request 279 from the KDS 110 at the operation 605, a first POS device waits for a predetermined time period at the operation 610 before sending a message to the other POS devices at the operation 615. At the operation 620, the first POS device retrieves the new data 295E at the operation 620 and broadcasts the new data to the other POS devices at the operation 625.

Turning to FIG. 7, an example user interface 700 that may be displayed on the display 145 of the KDS 110 is shown, in accordance with some embodiments of the present disclosure. The user interface 700 is only an example and not intended to be limiting in any way. The orientation, arrangement, format, style, font, etc. of the information shown on the user interface 700 may vary from one embodiment to another. The user interface 700 includes a plurality of tickets 705A-705F, each ticket being displayed in a separate user interface portion 710A-710F, respectively. User interface portions 710G-710J may be used to display additional tickets as more orders come in (e.g., as the new data 295C is received from the cloud server 235). Each of the tickets 705A-705F may be associated with one order and may include one or more line items, with each line item identifying one item of the order. For example, the ticket 705A includes two line items, including a first line item 715A for chips and curry and a second line item 715B for ice cream. Similarly, the other ones of the tickets 705B-705F include one or more line items. Each line item may be associated with a check box 720 that may be clicked when that item is prepared to keep track of the order. When all items in a particular ticket are prepared, the order may be marked complete using button 725.

When the new data 295C is retrieved from the cloud server 235, that new data may be displayed on the user interface 700. For example, if a new line item is added to an existing ticket (e.g., the ticket 705A), upon receiving the synchronization request 233 from the POS device 105 or the push server 245, the KDS 110 may retrieve the new line item from the cloud server 235 and display the new item on the ticket associated with that line item. For example, the KDS 110 may add the new line item as a separate row on the existing ticket. If a new order is received, the new order may be displayed within one of the user interface portions 710G-710J upon retrieving from the cloud server 235. Likewise, if changes are made to an order, the KDS 110 may update the ticket in response to receiving the new data 295C from the cloud server 235. For example, if the line item 715B is deleted or updated (e.g., to change the toppings), the KDS 110 may retrieve that information from the cloud server 235 and delete the line item 715B (e.g., if the order for ice cream was cancelled) or update the line item 715B (e.g., to reflect the new toppings, etc.)

Some of the description herein emphasizes the structural independence of the aspects of the system components or groupings of operations and responsibilities of these system components. Other groupings that execute similar overall operations are within the scope of the present application. Modules can be implemented in hardware or as computer instructions on a non-transient computer readable storage medium, and modules can be distributed across various hardware or computer based components.

The systems described above can provide multiple ones of any or each of those components and these components can be provided on either a standalone system or on multiple instantiation in a distributed system. In addition, the systems and methods described above can be provided as one or more computer-readable programs or executable instructions embodied on or in one or more articles of manufacture. The article of manufacture can be cloud storage, a hard disk, a CD-ROM, a flash memory card, a PROM, a RAM, a ROM, or a magnetic tape. In general, the computer-readable programs can be implemented in any programming language, such as LISP, PERL, C, C++, C#, PROLOG, or in any byte code language such as JAVA. The software programs or executable instructions can be stored on or in one or more articles of manufacture as object code.

Example and non-limiting module implementation elements include sensors providing any value determined herein, sensors providing any value that is a precursor to a value determined herein, datalink or network hardware including communication chips, oscillating crystals, communication links, cables, twisted pair wiring, coaxial wiring, shielded wiring, transmitters, receivers, or transceivers, logic circuits, hard-wired logic circuits, reconfigurable logic circuits in a particular non-transient state configured according to the module specification, any actuator including at least an electrical, hydraulic, or pneumatic actuator, a solenoid, an op-amp, analog control elements (springs, filters, integrators, adders, dividers, gain elements), or digital control elements.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices include cloud storage). The operations described in this specification can be implemented as operations performed by a data processing apparatus on data stored on one or more computer-readable storage devices or received from other sources.

The terms "computing device", "component" or "data processing apparatus" or the like encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data can include non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While operations are depicted in the drawings in a particular order, such operations are not required to be performed in the particular order shown or in sequential order, and all illustrated operations are not required to be performed. Actions described herein can be performed in a different order.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or aspect, and references to "an implementation," "some implementations," "one implementation" or the like are not necessarily mutually exclusive and are intended to indicate that a particular feature, structure, or characteristic described in connection with the implementation may be included in at least one implementation or aspect. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. References to at least one of a conjunctive list of terms may be construed as an inclusive OR to indicate any of a single, more than one, and all of the described terms. For example, a reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

Modifications of described elements and acts such as variations in sizes, dimensions, structures, shapes and proportions of the various elements, values of parameters, mounting arrangements, use of materials, colors, orientations can occur without materially departing from the teachings and advantages of the subject matter disclosed herein. For example, elements shown as integrally formed can be constructed of multiple parts or elements, the position of elements can be reversed or otherwise varied, and the nature or number of discrete elements or positions can be altered or varied. Other substitutions, modifications, changes and omissions can also be made in the design, operating conditions and arrangement of the disclosed elements and operations without departing from the scope of the present disclosure.

What is claimed is:

1. A system comprising:
a point of sale device comprising:
a display;
a communication interface to receive information;
one or more first servers; and
one or more first clients, the one or more first servers and the one or more first clients each associated with one or more memories having computer-readable instructions stored thereon that when executed by at least one of one or more processors cause the at least one of the one or more processors to:
determine that new order data is available at the point of sale device;
in response to determining that the new order data is available, send the new order data to a cloud server;
in response to determining that the new order data is successfully transmitted to the cloud server, generate a synchronization request indicating availability of the new order data at the cloud server;
identify one or more kitchen display systems to send the synchronization request to; and
send the synchronization request to each of the identified one or more kitchen display systems;
wherein each of the kitchen display systems receives the synchronization request;
wherein each of the kitchen display systems that receive the synchronization request retrieves the new order data from the cloud server in response to receiving the synchronization request; and
wherein at least one of the kitchen display systems performs an action based on the new order data in response to retrieving the new order data.

2. The system of claim 1, wherein the at least one of the one or more processors further execute computer-readable instructions to send the new order data to the cloud server via a synchronization service of the point of sale device.

3. The system of claim 1, wherein at least one of the one or more first servers and at least one of the one or more first clients communicate using a peer-to-peer protocol with another server and another client on each of the kitchen display systems.

4. The system of claim 1, wherein the one or more first servers comprises a discovery server and the one or more first clients comprises a discovery client, wherein the discovery server and the discovery client:
broadcast a discovery message to advertise presence of the point of sale device to the kitchen display systems that are connected on a same local area network as the point of sale device; and
receive a response back from each of the kitchen display systems in response the kitchen display systems receiving the discovery message to create a list of the kitchen display systems.

5. The system of claim 4, wherein the local area network is associated with a merchant.

6. The system of claim 1, wherein the synchronization request is a local area network synchronization request.

7. The system of claim 1, wherein each of the kitchen display systems comprises:
one or more second servers and one or more second clients to:
determine that other new order data is available at a respective one of the kitchen display systems;
send the other new order data to the cloud server;
determine that the other new order data is successfully sent to the cloud server;
generate another synchronization request; and
send the another synchronization request to the point of sale device.

8. The system of claim 1, wherein each of the kitchen display systems is further configured to:
receive an availability message from a push server associated with the cloud server, the availability message comprising a timestamp and indicating that additional new order data is available at the cloud server; and
in response to receiving the message, access the cloud server to retrieve the additional new order data that corresponds to the timestamp.

9. The system of claim 1, wherein the one or more processors further execute computer-readable instructions to maintain a list of kitchen display systems that are on a same network as the point of sale device, each of the kitchen display systems on the list associated with a timestamp when each of the kitchen display systems was discovered by the point of sale device, and wherein the timestamp is used to identify the one or more kitchen display systems to send the synchronization request to based on comparing the timestamp with a threshold.

10. One or more non-transitory computer-readable media comprising computer-readable instructions stored thereon that when executed by at least one of one or more processors associated with one or more first servers and one or more first clients of a point of sale device cause the at least one of the one or more processors to:
determine that new order data is available at the point of sale device, wherein the point of sale device further comprises a display and a communication interface to receive information;
in response to determining that the new order data is available, send the new order data to a cloud server;
in response to determining that the new order data is successfully transmitted to the cloud server, generate a synchronization request indicating availability of the new order data at the cloud server;
identify one or more kitchen display systems to send the synchronization request to; and
send the synchronization request to each of the identified one or more kitchen display systems;
wherein each of the kitchen display systems receives the synchronization request;
wherein each of the kitchen display systems that receive the synchronization request retrieves the new order data from the cloud server in response to receiving the synchronization request; and
wherein at least one of the kitchen display systems performs an action based on the new order data in response to retrieving the new order data.

11. The one or more non-transitory computer-readable media of claim 10, wherein the at least one of the one or more processors further execute computer-readable instructions to send the new order data to the cloud server via a synchronization service of the point of sale device.

12. The one or more non-transitory computer-readable media of claim 10, wherein at least one of the one or more first servers and at least one of the one or more first clients communicate using a peer-to-peer protocol with another server and another client on each of the kitchen display systems.

13. The one or more non-transitory computer-readable media of claim 10, wherein the one or more first servers comprises a discovery server and the one or more first clients comprises a discovery client, wherein the discovery server and the discovery client:
broadcast a discovery message to advertise presence of the point of sale device to the kitchen display systems that are connected on a same local area network as the point of sale device; and
receive a response back from each of the kitchen display systems in response the kitchen display systems receiving the discovery message to create a list of the kitchen display systems.

14. The one or more non-transitory computer-readable media of claim 13, wherein the local area network is associated with a merchant.

15. The one or more non-transitory computer-readable media of claim 10, wherein the synchronization request is a local area network synchronization request.

16. The one or more non-transitory computer-readable media of claim 10, wherein each of the kitchen display systems comprises:
one or more second servers and one or more second clients to:
determine that other new order data is available at a respective one of the kitchen display systems;
send the other new order data to the cloud server;
determine that the other new order data is successfully sent to the cloud server;
generate another synchronization request; and
send the another synchronization request to the point of sale device.

17. The one or more non-transitory computer-readable media of claim 10, wherein each of the kitchen display systems is further configured to:
receive an availability message from a push server associated with the cloud server, the availability message comprising a timestamp and indicating that additional new order data is available at the cloud server; and
in response to receiving the message, access the cloud server to retrieve the additional new order data that corresponds to the timestamp.

18. The one or more non-transitory computer-readable media of claim 10, wherein the one or more processors further execute computer-readable instructions to maintain a list of kitchen display systems that are on a same network as the point of sale device, each of the kitchen display systems on the list associated with a timestamp when each of the kitchen display systems was discovered by the point of sale device, wherein the timestamp is used to identify the one or more kitchen display systems to send the synchronization request to list based on comparing the timestamp with a threshold.

19. A method comprising:
determining, at a point of sale device, that new order data is available at the point of sale device, wherein the point of sale device further comprises a display and a communication interface to receive information;
in response to determining that the new order data is available, sending, by the point of sale device, the new order data to a cloud server;
in response to determining that the new order data is successfully transmitted to the cloud server, generating, by the point of sale device, a synchronization request indicating availability of the new order data at the cloud server;
identifying, by the point of sale device, one or more kitchen display systems to send the synchronization request to; and
sending, by the point of sale device, the synchronization request to each of the identified one or more kitchen display systems;
wherein each of the kitchen display systems receives the synchronization request;
wherein each of the kitchen display systems that receive the synchronization request retrieves the new order data from the cloud server in response to receiving the synchronization request; and
wherein at least one of the kitchen display systems performs an action based on the new order data in response to retrieving the new order data.

20. The method of claim 19, wherein the point of sale device comprises a discovery server and a discovery client, and wherein the method further comprises:
broadcasting, by the discovery server, a discovery message to advertise presence of the point of sale device to the kitchen display systems; and
receiving, by the discovery client, a response back from each of the kitchen display systems in response the kitchen display systems receiving the discovery message to create a list of the kitchen display systems, wherein the kitchen display systems and the point of sale device are on a same local area network.

* * * * *